United States Patent [19]

Baeger

[11] Patent Number: 4,728,309

[45] Date of Patent: Mar. 1, 1988

[54] METHOD FOR THE MANUFACTURE OF A DISPLAY DEVICE, PARTICULARLY A LIQUID CRYSTAL DISPLAY

[75] Inventor: Holm Baeger, Schwalbach, Fed. Rep. of Germany

[73] Assignee: VDO Adolf Schindling AG, Frankfurt am Main, Fed. Rep. of Germany

[21] Appl. No.: 905,095

[22] Filed: Sep. 5, 1986

Related U.S. Application Data

[62] Division of Ser. No. 689,908, Jan. 9, 1985, Pat. No. 4,692,231.

[30] Foreign Application Priority Data

Jan. 9, 1984 [DE] Fed. Rep. of Germany ....... 3400429

[51] Int. Cl.<sup>4</sup> .............................................. G02F 1/133
[52] U.S. Cl. ...................................... 445/25; 156/292; 156/289
[58] Field of Search .................... 445/25, 24; 350/344; 427/208.8, 221; 156/292, 289

[56] References Cited

U.S. PATENT DOCUMENTS

| | | | |
|---|---|---|---|
| 3,992,558 | 11/1976 | Smith-Johannsen | 427/221 X |
| 4,165,157 | 8/1979 | Kobale et al. | 350/344 |
| 4,249,800 | 2/1981 | Spruijt | 350/344 |
| 4,428,764 | 1/1984 | Snitzer et al. | 445/25 |

FOREIGN PATENT DOCUMENTS

| | | | |
|---|---|---|---|
| 102922 | 6/1983 | Japan | 350/344 |
| 194015 | 11/1983 | Japan | 350/344 |

*Primary Examiner*—Kenneth J. Ramsey
*Attorney, Agent, or Firm*—Martin A. Farber

[57] ABSTRACT

A display device, particularly a liquid crystal display, has spacing elements (10) arranged uniformly distributed between two parallel support plates (1, 2). These spacing elements (2) bear a layer of adhesive (11) and are bonded to both support plates (1, 2), precisely in the same way as in the spacing frame (4) is. In this way, the support plates (1, 2) do not bulge toward the outside.

In the manufacture of the display device, the spacing frame (4) is first applied onto a support plate (2) followed then by the spacing elements (10). After the second spacing plate (1) has been placed on top, the parts are bonded together under pressure and temperature.

9 Claims, 1 Drawing Figure

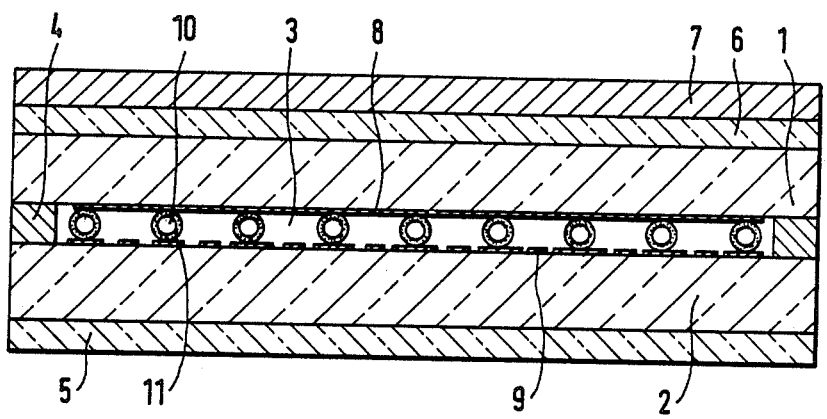

METHOD FOR THE MANUFACTURE OF A DISPLAY DEVICE, PARTICULARLY A LIQUID CRYSTAL DISPLAY

This is a division of application Ser. No. 689,908, filed Jan. 9, 1985, now U.S. Pat. No. 4,692,231.

BACKGROUND OF THE INVENTION

The invention relates to a method of manufacturing a display device, particularly a liquid crystal display, having two support plates which are parallel to each other and between which a medium which can be switched between two optically different states is enclosed, and having an outer spacing frame as well as a plurality of spacing elements (spacers) between the support plates, the elements being held in a fixed position by adhesive.

In the case of large-area and/or thin-wall liquid crystal displays, important characteristic data such as the switch behavior or the threshold voltage are very dependent on the thickness of the liquid crystal layer between the support plates. Liquid crystal displays are already being constructed today in which the distance between the support plates is less than 10 μm. In order to be able to satisfy such high demands on the precise distance between the support plates, it is not sufficient to bond the support plates to each other solely at the spacing frame, but, rather, spacing elements must be provided also within the visible region.

From Federal Republic of Germany OS No. 28 49 402 it is already known to arrange spacing elements at given places in a liquid crystal display, said elements being bonded to the two support plates at the same time as the bonding of the spacing frame. The spacing elements are fixed symbols which, therefore, can be arranged only at very specific places in the visible field of the display device. However, it has been found in practice that, particularly in the case of large-area display devices, the support plates may bulge toward the outside, so that the thickness of the liquid crystal layer varies.

It is an object of the invention to develop a method of manufacturing a display device of the aforementioned type in which bulging of the support plates is effectively avoided, independently of the provision of fixed symbols.

SUMMARY OF THE INVENTION

According to the present invention, the spacing elements (10) are distributed uniformly in the visible field between the support plates (1, 2) and are invisible to the eye due to their size and nature. By this uniform distribution, the spacing of the support plates is maintained over the entire surface of the display device very precisely at a spacing which is determined by the thickness of the spacing elements. The display device of the invention is therefore very particularly suitable for large-area displays. Aside from this, a laminated-glass effect is obtained by the bonding of the spacing elements to the support plates. The spacing elements exert a shatter-proof effect in case of violent destruction of the display device by holding the splinters of glass fast. This shatter-proof protection has, up to now, been obtained by polarizers on both sides of the liquid display. As a result of the invention, display devices without polarizers are possible. The display device of the invention can be manufactured in a particularly simple and inexpensive manner if the spacing elements (10) are adhesive-coated solid bodies.

The spacing elements (10) can be arranged particularly easily between the spacer plates if said elements are spherical.

Another advantageous development of the invention consists therein that, before they are bonded to the support plates, the spacing elements (10) are provided over their layer of adhesive with an encapsulating layer which decomposes under pressure and temperature to effect the bonding. This encapsulating layer makes it possible to enclose liquid adhesives such as, for instance, polyurethane. The encapsulating layer sees to it that, despite the layer of liquid adhesive, a dry, pourable product is produced, which is of importance for the introduction of the spacer elements.

According to a further aspect of the invention, namely the method of producing such display devices, there are provided spacing elements (10) which are uniformly distributed in the viewing field between the support plates (1, 2) and are of such a size and nature that they are invisible to the eye.

Due to the fact that the spacing elements are not only arranged at specific places in the viewing field but are also uniformly distributed, the support plates are at a very precise distance apart from each other at all places. This makes it possible to construct liquid crystal displays of very large area. Aside from this, the aforementioned laminated-glass effect is obtained, so that in the event of violent destruction of the liquid crystal display there will be no dangerous splintering of the support plates, which in most cases consist of glass. According to the invention, the spacer elements (10) are solid bodies which are coated with an adhesive before they are introduced between the support plates (1, 2).

Another advantageous embodiment of the method of the invention consists therein that the spacing elements (10) are coated with two components of a two-component adhesive which are separated from each other by a barrier layer. The barrier layer breaks down under the action of pressure and temperature during the bonding together of the support plates so that the adhesive then becomes active. Such two-component adhesives have a particularly good adhesive effect.

Encapsulating the adhesive layer (11) on its outer side makes it possible also to use liquid adhesives without the required pourability of the spacing elements being thereby lost.

As spacing elements (10), use may be made of glass fibers which, after the drawing of the fibers, are immersed in an adhesive preparation and then dried and cut to the correct length. An alternative to this resides in introducing the spacing elements (10) in the form of balls or lengths of glass fiber into an adhesive solution and then separating them by spraying.

Depending on the adhesive preparation, it may be advisable to dry the spacing elements (10) by exposure to eddies in a stream of air.

BRIEF DESCRIPTION OF THE DRAWING

With the above and other objects and advantages in view, the present invention will become more clearly understood in connection with the detailed description of a preferred embodiment, when considered with the accompanying drawing, of which the only FIGURE is a cross section through the liquid crystal cell. The drawing is diagrammatic in order to facilitate understanding; individual parts which are not absolutely necessary for an understanding of the invention, such as the electric lead wires, have not been included in the drawing.

DETAILED DESCRIPTION OF THE PREFERRED EMBODIMENT

The liquid crystal display shown in the drawing has, enclosed between two support plates 1, 2, and medium 3, which can be switched between two different optical states. The support plates 1, 2 are held at a precise distance apart on their outer side by a spacing frame 4. On the outside of the support plates 1, 2 a front polarizer 5 and a rear polarizer 6 are also arranged. Behind the rear polarizer 6 there is a reflector 7. The electric field is produced in the medium by means of electrodes 8, 9. The electrode 9 consists of individual segments.

It is essential for the invention that spacing elements, such as, for instance, the spacing elements (spacers) 10, be arranged distributed uniformly within the spacing frame 4 in the viewing field of the liquid crystal display. All spacing elements 10 are so small and of such a nature that they are not perceptible to the eye and therefore do not interfere with the display. The spacing elements 10 bear a layer of adhesive 11 by which they are bonded to the support plates 1, 2. This bonding is effected at the same time as the bonding of the spacing frame 4.

For the manufacture of the liquid crystal display of the invention, the spacing frame 4 is placed on one support plate 2. The spacing elements 10 are then introduced, uniformly distributed. The other support plate 1 is then placed on top. Under the action of pressure and temperature the spacing frame 4 and all spacing elements 10 become bonded to the support plates 1, 2.

Further details with respect to the development of the adhesive layer 11 and possible encapsulation of this adhesive layer are set forth in the claims and have been explained in the preamble to the disclosure. The diameter of a spacer is in the range of approximately 7–10 $\mu$m, preferably 9 $\mu$m, the specific value of the diameter depending on the spacing between the plates. The adhesive may be any of wellknown commercially available adhesives that can be drawn out as a thin film and are substantially transparent. Spacers which are made from spun glass have the same diameter and a length of about 30–50 $\mu$m. Preferably the index of refraction of the material of the spacers is less than the index refraction of the material of the substrates. The frame can be made in the same way as shown in the afore mentioned reference, Federal Republic of Germany OS No. 28 49 402.

I claim:

1. A method for producing of a display device, particularly a liquid crystal display, including two support plates which are parallel to each other, and a medium which can be switched between two optically different states enclosed between the two plates, and wherein the support plates are spaced apart by an outer spacing frame; the method comprising the steps of forming spacers of such a size and nature that they are invisible to the eye, providing the spacers between the support plates, uniformly distributing the spacers in the viewing field between the support plates, bonding the plates to each other by a plurality of the spacers between the support plates, the method including the steps of coating the spacers with two components of a two-component adhesive, and separating components of the adhesive from each other by a barrier layer.

2. The method according to claim 1, wherein the spacers are solid bodies, and wherein the steps of coating the spacers with the adhesive and separating the components by the barrier layer are done before the spacers are introduced between the support plates.

3. The method according to claim 1, wherein said step of forming includes constructing the spacers of glass fibers and after a drawing of the fibers, immersing the fibers in an adhesive preparation and then drying and cutting the fibers to correct length.

4. The method according to claim 3, wherein said step of drying is accomplished by subjecting the spacers to eddies in a stream of air.

5. The method according to claim 1, further comprising the step of introducing the spacers in the form of balls or lengths of glass fiber into an adhesive solution and then separating them by spraying.

6. A method for producing of a display device, particularly a liquid crystal display, including two support plates which are parallel to each other, and a medium which can be switched between two optically different states enclosed between the two plates, and wherein the support plates are spaced apart by an outer spacing frame; the method comprising the steps of forming spacers of such a size and nature that they are invisible to the eye, providing the spacers between the support plates, uniformly distributing the spacers in the viewing field between the support plates, bonding the plates to each other by a plurality of the spacers between the support plates, the method further comprising the steps of coating the spacers with an adhesive layer before they are introduced between the support plates, and encapsulating the adhesive layer on its outer side, the encapsulating layer decomposing under pressure and temperature with the bonding to the support plates.

7. The method according the claim 6, wherein the spacers are formed as solid bodies.

8. The method according to claim 6, wherein said step of forming includes constructing the spacers of glass fibers and after a drawing of the fibers, immersing the fibers in an adhesive preparation and then drying and cutting the fibers to correct length.

9. The method according to claim 6, further comprising the step of introducing the spacers in the form of balls or lengths of glass fiber into an adhesive solution and then separating them by spraying.

* * * * *